Patented Sept. 16, 1941

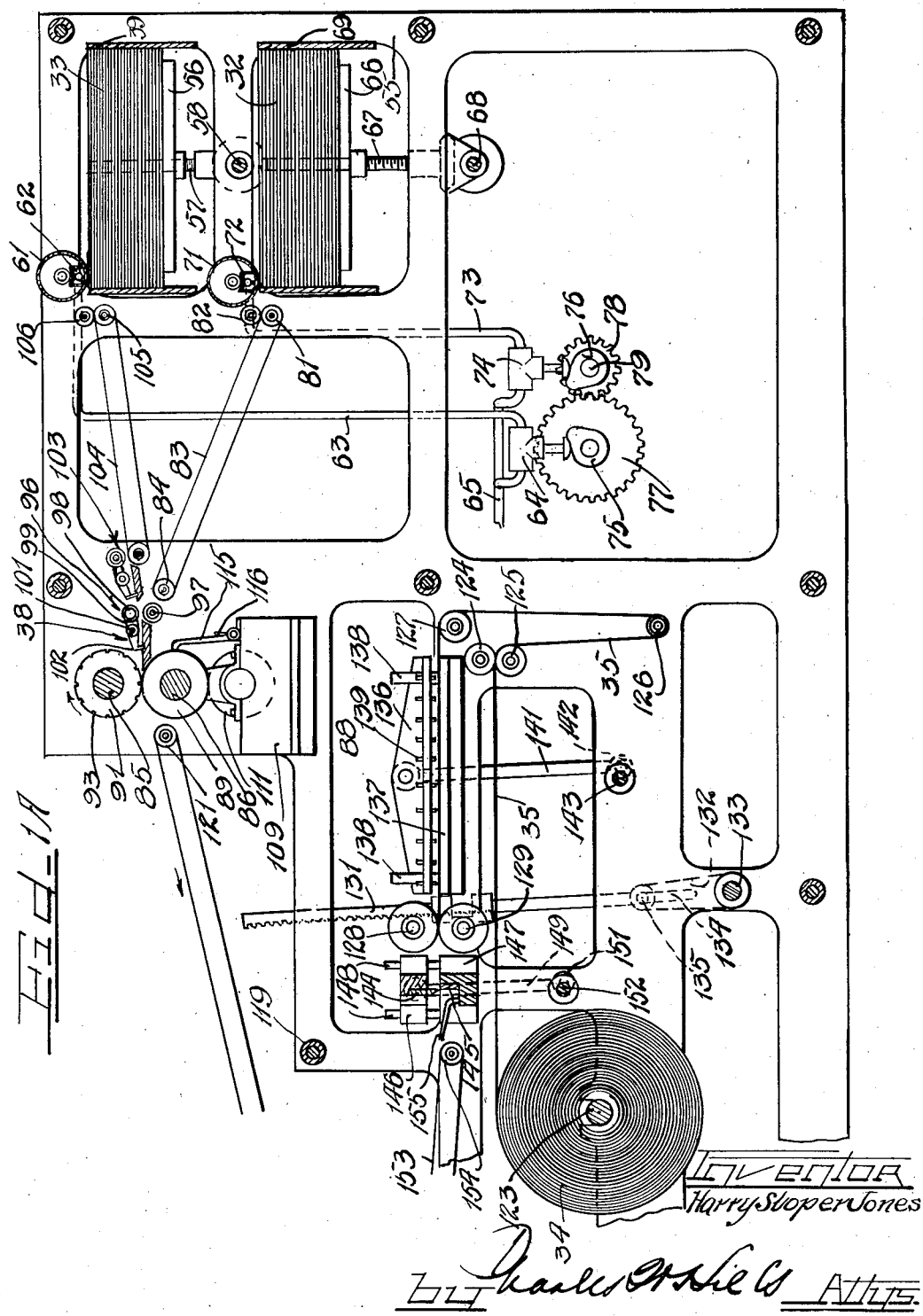

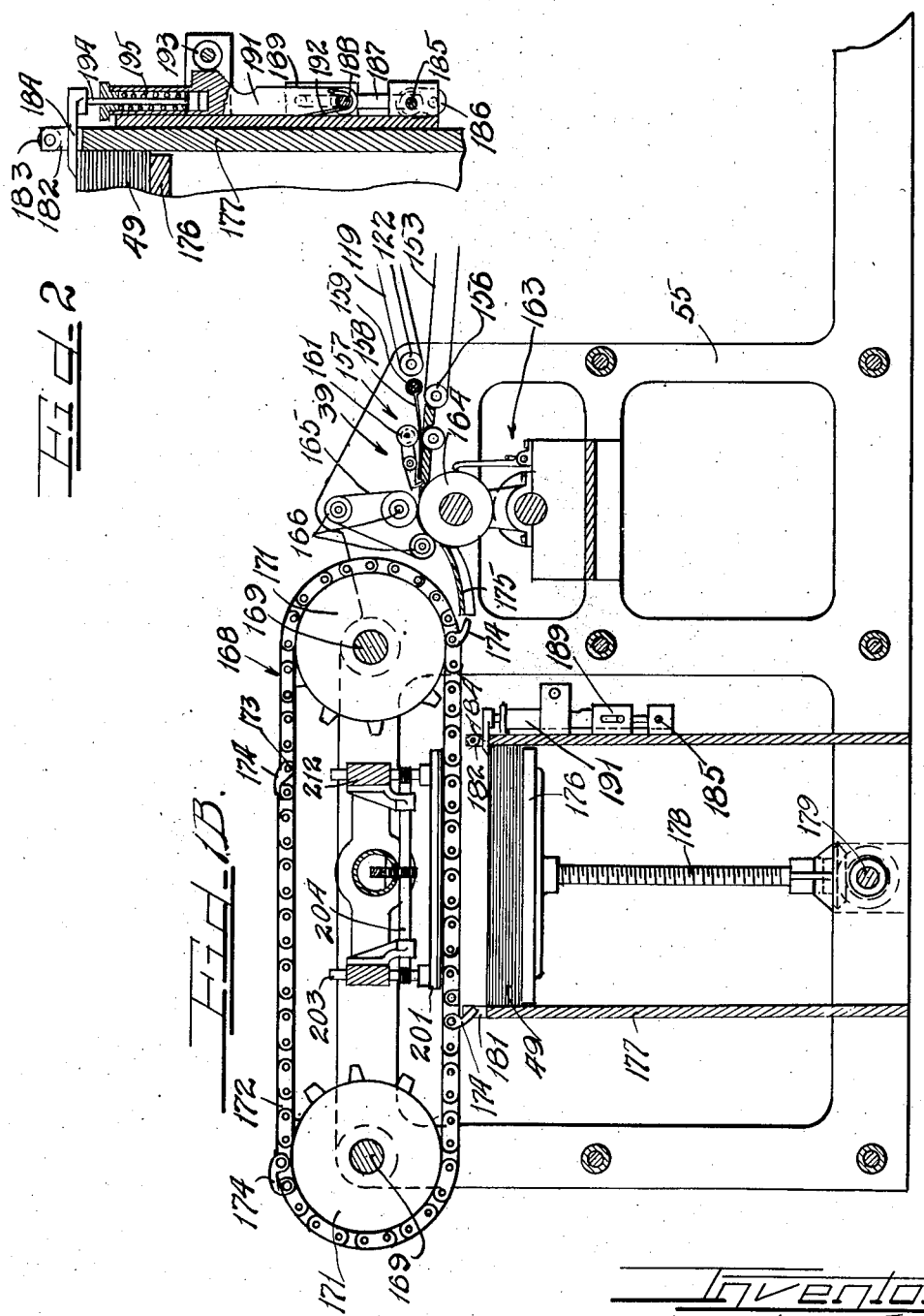

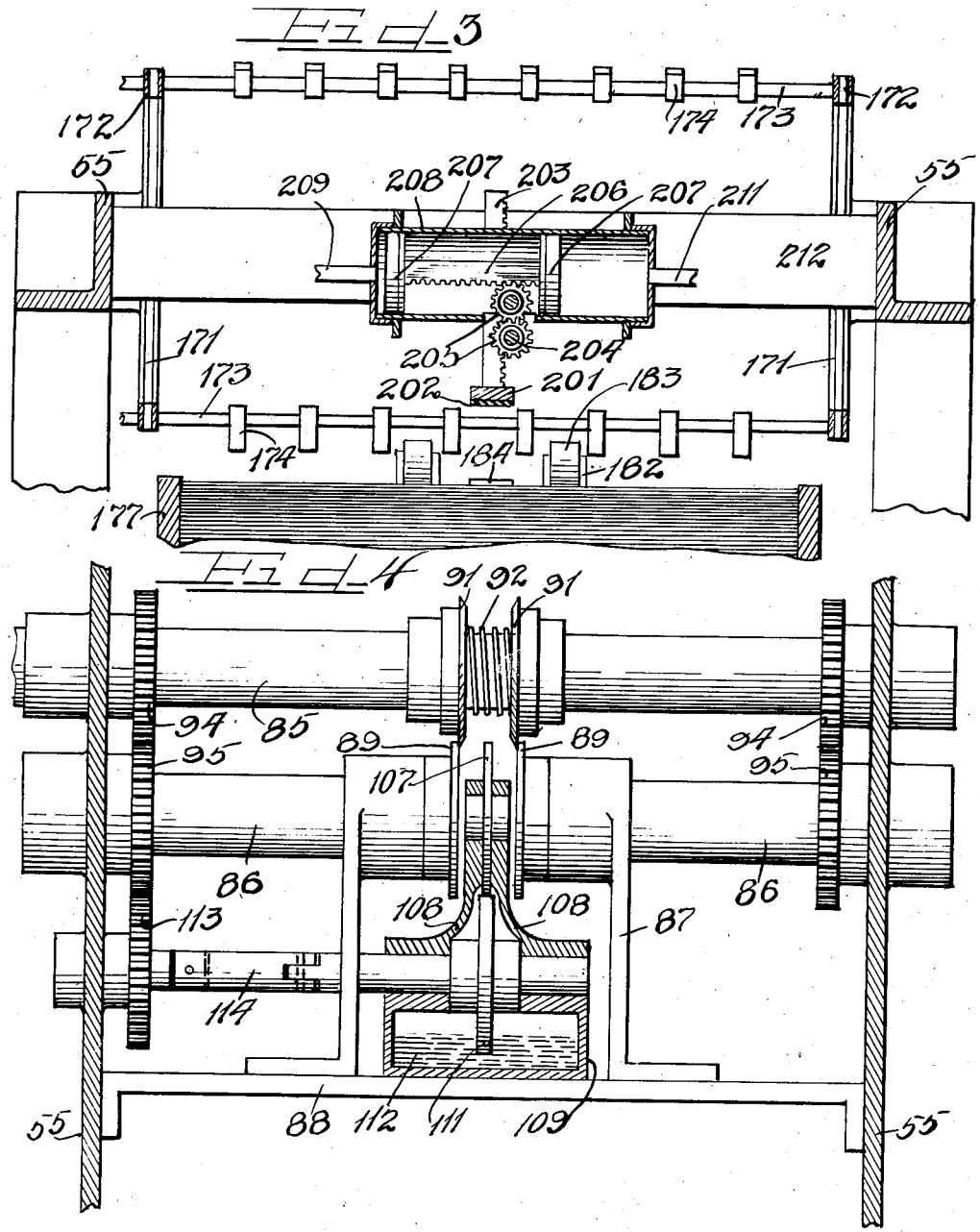

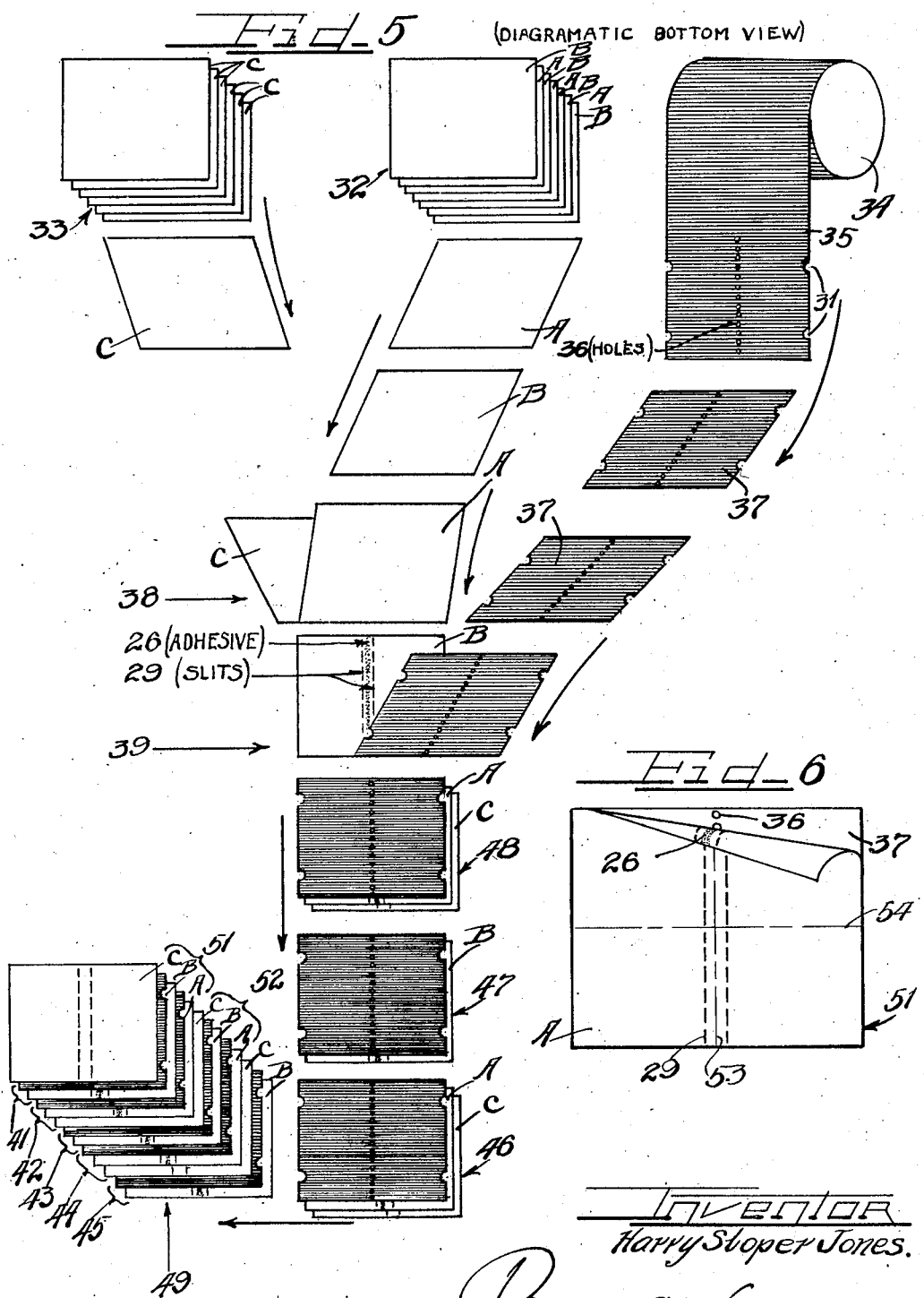

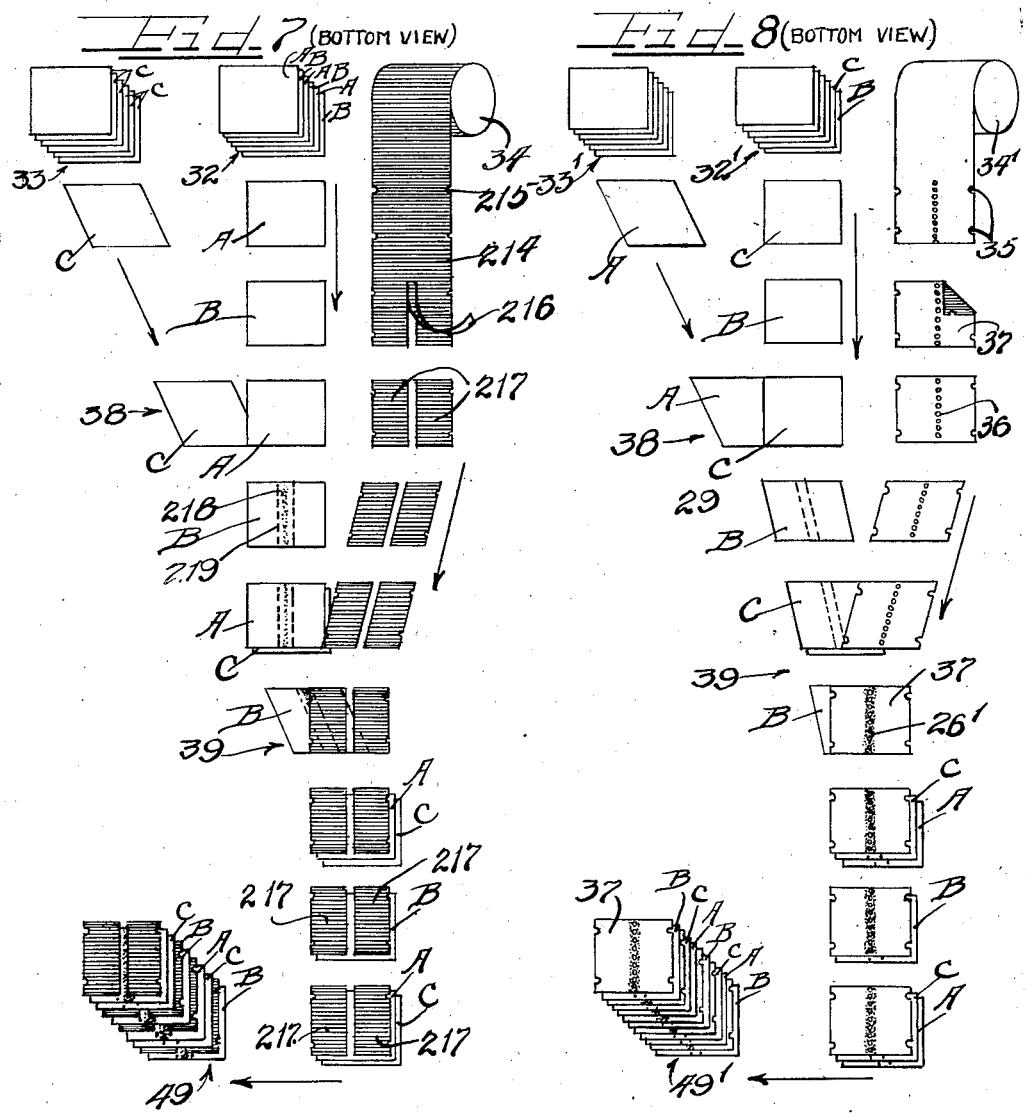

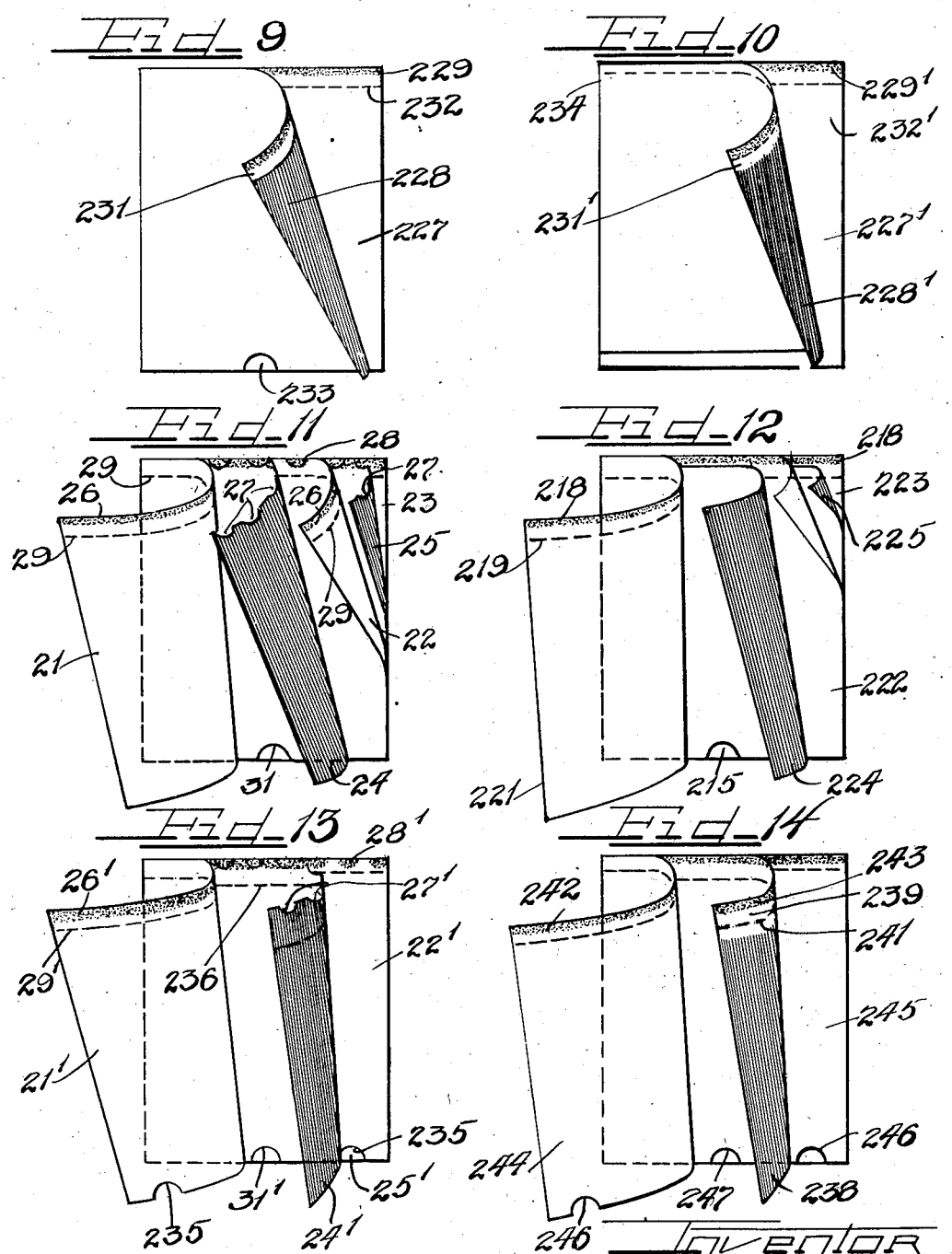

2,255,777

UNITED STATES PATENT OFFICE 2,255,777

MANIFOLD SET ASSEMBLING APPARATUS
AND METHOD

Harry Sloper Jones, Chicago, Ill.

Application January 30, 1939, Serial No. 253,514

21 Claims. (Cl. 270—52)

This invention relates to a method of assembling manifold sets or groups of sheets of writing paper interleaved with carbon paper, and to a machine for carrying out the method.

It has been found economical, in many cases where forms are to be filled out in duplicate or triplicate etc., to assemble the forms to be so filled out with the necessary carbon paper interleaved between them, the assemblies thus formed being termed "manifold sets," and to provide a supply of such manifold sets to the person who is to use them. This practice has proven to be most economical when the time of the person filling out the forms is particularly valuable or when an expensive accounting machine or the like is used in connection with the operation. Manifold sets can be and are, in some cases, assembled by hand, but it is obvious that such a repetitious operation can be more economically performed by machine. Therefore, machines have been devised and built and are in successful use for making and assembling manifold sets, but the machines which have thus far proven to be successful deal only with continuous forms or forms which are printed upon continuous webs of paper and are later severed into separate manifold sets. Such machines are excellent for producing manifold sets in extremely large quantities but they are extremely expensive and require a very large volume of work to keep them busy.

The principal object of this invention is to provide a relatively inexpensive machine for assembling manifold sets from ream-cut paper which has already been printed and ruled and from carbon paper supplied preferably in a continuous web from a roll.

Another object of my invention is to provide one or more methods of assembling manifold sets which can be carried out by a relatively simple machine.

Another object of my invention is to provide methods of assembling manifold sets in which the adhesive for securing together the separate sheets of each set is applied as the sets are assembled and in which the assembling of successive sets can be continuously carried on without the successive sets sticking to each other.

A still further object of this invention is to provide a method and a machine for making manifold sets in which the adhesive for holding together the various sheets in a set lies entirely between the sheets and does not form a back along the edge of the manifold sets which would make it more difficult to insert into a typewriter or other machine.

A still further object of this invention is to provide a machine and method of making manifold sets which are readily adaptable to the manufacture of sets having different numbers of sheets and having the carbon sheets held in place in different fashions.

Another object of my invention is to provide a machine for assembling manifold sets which will form a pile of sheets of writing paper and carbon paper, the pile thus formed having one sheet of writing paper immediately above each sheet of carbon paper and, at regular intervals, having two sheets of writing paper together, so that the pile can be divided between each of said two sheets of writing paper to form separate manifold sets.

Another object of my invention is to provide a machine having means for sliding one sheet of paper on top of another to a position of registry therewith and arranged so that such sliding can occur without the top sheet dragging on the bottom sheet even though the top sheet has a line of adhesive on its underside.

Another object of my invention is to provide a machine for forming a pile of sheets of paper having lines of adhesive on their undersides and for pressing down the sheets along the lines of adhesive after each addition of sheets to the pile.

Another object of my invention is to provide a machine for assembling manifold sets in which successive groups of sheets are moved to a position where they are deposited in a pile and having means for holding the top sheet of the pile against being dragged out of place as the next group of sheets is pulled across the top of the pile to a position in registry therewith.

Other objects and features of this invention will more fully appear from the following detail description, taken in connection with the accompanying drawings, in which:

Figures 1A and 1B are two parts of a diagrammatic longitudinal section of one of the preferred forms of machine embodying my invention;

Figure 2 is a sectional view, on an enlarged scale, of one of the details of the machine shown in Figures 1A–1B;

Figure 3 is a cross-sectional view taken on the line III—III of Figure 1B and looking in the direction of the arrows;

Figure 4 is a cross-sectional view taken on the line IV—IV of Figure 1A and looking in the direction of the arrows;

Figure 5 is a diagrammatic bottom view illustrating part of one form of process involving my invention;

Figure 6 is a plan view illustrating a succeeding step in the process illustrated in Figure 5;

Figures 7 and 8 are diagrammatic bottom views illustrating two other forms of process involving my invention;

Figures 9 to 14 are plan views of six different species of manifold sets made according to my invention.

The invention may perhaps be most readily understood by first considering a typical product produced by the invention, such as the manifold set shown in Figure 11. This particular manifold set comprises three sheets of writing paper 21, 22 and 23 and two sheets of interleaf carbon paper 24 and 25. The sheets of writing paper 21, 22 and 23 may be blank or may have any desired form printed thereon.

Each sheet of writing paper 21 and 22, except the last sheet 23, has a line of adhesive 26 on its back along the upper edge which secures it to the underlying sheet of carbon paper 24 or 25. The upper edges of the sheets of carbon paper 24—25 are provided with a row of notches 27 which, in the manifold set illustrated, are semicircular in shape. The notches 27 expose semicircular areas 28 on the upper surfaces of each of the writing sheets 22 and 23 below the top sheet 21 and allow each of the lower writing sheets 22 and 23 to adhere at these areas 28 to the line of adhesive 26 on the back of the writing sheet immediately above. Thus each writing sheet is secured by the line of adhesive 26 to the sheet of carbon paper immediately below it and to the next writing sheet, and the entire manifold set forms a single assembly. It may be noted that the adhesive 26 lies entirely between the sheets of paper and does not cover the edges of the sheets. Because of this fact, and the fact that the layers of adhesive are quite thin and do not materially increase the thickness of the manifold set, the fact that the sheets of paper are secured together does not interfere in any way with their being fed into the feeding rolls of a typewriter, bookkeeping or similar machine.

Each of the writing sheets 21, 22 and 23 is provided with a row of slit perforations 29 across the head of the sheet immediately below the line of adhesive 26. The lines of perforations 29 allow the main portions of the sheets 21, 22 and 23 to be readily detached from the secured together portion when it is desired to separate the sheets. In order to facilitate this operation, each of the carbon sheets 24—25 is provided with a thumb-cut 31 in its lower edge, the thumb-cuts in the separate carbon sheets being placed one above the other so that the three writing sheets 21, 22 and 23 may be grasped between the thumb and finger at this point without grasping the carbon sheets 24—25. The writing sheets 21, 22 and 23 may then be torn off along the lines of perforation 29 and pulled out from their interleaf relation with the carbon sheets 24 and 25, leaving the carbon sheets 24 and 25 attached to the glued together head portion of the writing sheets 21, 22 and 23 and leaving the main portions of the writing sheets 21, 22 and 23 separate from each other and from the carbon sheets. Thus this manifold set is a "snap-out form" in which the filled in forms 21, 22 and 23 can be separated from the carbons 24—25 at one snap of the hands.

One of the processes by which the manifold set shown in Figure 11 can be assembled is illustrated in Figure 5, which shows, in a diagrammatic manner, the movement of the various sheets as seen from underneath. As illustrated in Figure 5, the process is arranged for making a three part form, that is, a manifold form or set having three writing sheets as in the form shown in Figure 11. The preliminary steps in the process consists of printing the three forms on sheets of paper, printing two, four, six or other even number of forms on each sheet according to the relative sizes of the forms and the sheets. In the example illustrated, four forms are printed on each sheet, the forms being printed head to head along the center line of the sheets. The forms are then arranged in two piles 32 and 33, the first pile 32 containing the sheets bearing the first two forms, and the second pile 33 being composed entirely of the sheets C bearing the third form. The sheets A and B, bearing the first and second forms respectively, are arranged in alternate arrangement in the pile 32 as shown in Figure 5.

The carbon paper is supplied from a roll 34 from which it comes in a continuous web 35. As the carbon paper 35 is unrolled from the roll 34 a row of holes 36 is punched down its center and notches or thumb-cuts 31 are punched along its two edges. The web of carbon paper 35 is then cut into separate sheets 37, one sheet at a time being cut off.

At the same time as the separate carbon sheets 37 are being punched and cut off from the end of the web 35, sheets A and B for the first and second forms are being removed one at a time from the pile 32 and moved to a first assembly station 38, one sheet A or B being thus moved for each carbon sheet 37 that is formed. At the same time, sheets C for the third form are being removed one after another from the pile 33 and are also moved to the assembly station 38. However, the sheets C are removed from the pile 33 only half as fast as the carbon sheets 37 are formed and half as fast as sheets A or B are being removed from the pile 32. Thus one sheet C is removed from the pile 33 for every other sheet removed from the pile 32.

The movement of the sheets A, B and C is timed so that each sheet C arrives at the assembling station 38 at the same time or an instant later than a sheet A and is placed on top of the sheet A. This forms an assembly of two sheets A and C.

As soon as an assembly of two sheets A and C has been formed at the assembling station 38 or as soon as a single sheet B arrives at the assembling station 38, the two sheets or the single sheet are moved on to a second assembling station 39. On their way to the second assembling station 39, a line of adhesive 26 is applied along the center of the under surface of each single sheet B or each group of sheets A and C, and a row of slits 29 is cut along each side of the line of adhesive 26. Thus each of the sheets A and B arrive at the assembling station 39 with a line of adhesive 26 along its center and every other sheet A from the pile 32 has another sheet C riding on top of it. Since the sheets C are on top of the sheets A they receive no adhesive. All the sheets, A, B and C, however, are perforated or slit as at 29.

Each time that one sheet B or a pair of sheets A and C reaches the second assembling station 39, a carbon sheet 37 is also brought to the second assembling station 39, the carbon sheets 37 coming under the sheets B, A and C and arriving either approximately simultaneously with or slightly before the other sheets.

Thus each carbon sheet becomes associated either with one writing sheet B or two writing sheets A and C and forms therewith a group of either two or three sheets.

As each group of either two or three sheets is formed at the second assembling station 39, it is removed and carried to a third or final assembling station 49 and placed on top of a pile of similar previously formed groups of sheets. In the drawings, the successive groups of sheets which have been formed are designated by the numbers 41 to 48, the odd numbers designating the groups composed of a carbon sheet and the single sheet of writing paper B for the second of the three forms, and the even numbers designating the groups composed of a carbon sheet and the two sheets of writing paper A and C for the first and third forms.

As each of the groups 41 to 48 of sheets is formed at the second assembly station 39, the sheet of carbon paper comes in contact with the lowermost writing sheet surface, to which the line of adhesive 26 has been applied, and adheres thereto because (as illustrated in Figure 5, which is a bottom view) the coated side of the sheet 37 of carbon paper is underneath and the uncoated side to which adhesive can stick lies against the bottom of the writing sheet A or B. Both the lines of adhesive 26 and the rows of holes 36 are in the center of the sheets, so that the adhesive 26 on the bottoms of the writing sheets A and B sticks to the portion of the carbon sheets 37 between the holes 36 and also appears through the holes 36.

Then, when the successive groups 41 to 48 of sheets are assembled in a pile at the third or final assembling station 49, each sheet A or B having a sheet of carbon paper immediately below it will stick through the holes in that sheet of carbon paper to the sheet of writing paper B or C immediately below that sheet of carbon paper. Thus the adhesive will not only secure each sheet of carbon paper to the sheet of writing paper A or B immediately above it, but will also secure the writing sheets A and B together and the writing sheets B and C together. At the same time, the writing sheets A and C which were placed together at the first assembling station 38 will have no adhesive or carbon paper between them and will be readily separable. Thus there will be formed, at the final assembling station 49, successive sets 51 and 52 of sheets, each set 51 or 52 being composed of three writing sheets A, B and C interleaved with two carbon sheets. The separate sheets, of course, will lie one directly above the other, but they have been shown in the diagram as being offset from each other in order to show each sheet.

The final step in producing the finished "snap-out" form for manifold sets consists in cutting the assembled sets 51 and 52 of sheets along their two center lines 53 and 54 as shown in Figure 6, thus producing four finished manifold sets from each set of sheets. It will be seen that one center line 53 bisects the holes 36 in the carbon sheet 37 and lies between the two rows of slit perforations 29, so that each quarter of the set 51 will have notches along one edge of each sheet of carbon paper and be otherwise the same as the manifold set shown in Figure 11.

From the above description, it will be seen that I have provided a manifold form or set which can be readily produced by the method which I have devised and described above, and that the method consists, for the greater part, of simple steps repeated at regular intervals and is therefore especially adapted to be performed by machines. With one embodiment of the manifold set to be produced and one embodiment of the method for producing it in mind, the machine which I have invented for carrying out this and other methods and for producing this and other products may be readily understood.

*The machine*

One of the preferred forms of machine for carrying out the above described process and producing the above described manifold form, is shown diagrammatically in Figures 1A, 1B, 2, 3 and 4 of the accompanying drawings and comprises a pair of side frames 55 which carry the major portion of the mechanism.

At one end of the machine are located two job pile feeders which handle the various sheets of writing paper that go up to make the finished form. The upper feeder comprises a table 56 which is adapted to carry a pile of forms 33. The table 56 is carried on a pair of vertical screws 57 (only one of which appears in the drawings) joined together by a transverse shaft 58 to which each of the screws 57 is geared. Conventional mechanism, such as that employed on the "Fuller" job pile feeder or on the "Hickok" S. F. job pile feeder, is provided for rotating the cross shaft 58 and maintaining the top of the pile of sheets 33 at the proper level when the machine is in operation. A feed box 59 encloses the vertically movable table 56 and locates the pile of sheets 33 horizontally.

A conventional suction feed mechanism, such as is employed in the "Hickok" S. F. job pile feeder, is employed for feeding the sheets one at a time from the top of the pile 33. The suction feeder comprises a suction feed roller 61 containing a suction box 62 which is connected by means of a suction line 63 and a valve 64 to a main suction line 65 leading to a suction pump.

The lower pile feeder which carries the pile of sheets 32 is similar to the upper pile feeder just described and comprises a feed table 66 carried by a pair of upright screws 67 which are geared to a cross shaft 68. The feed table 66 works within a box 69 and the cross shaft 68 which controls its level is operated by the same type of mechanism as is used in connection with the upper feed table 56.

The lower pile feeder also comprises a suction feed roll 71 having a suction box 72 connected by means of a suction line 73 and a valve 74 to the main suction line 65.

The two pile feeders described above are shown only diagrammatically in the drawings, as these mechanisms are conventional in structure and their details form no part of the present invention. These details, as will be obvious to those skilled in the art, include air jets to separate the sheets at the tops of the piles, pumps for providing the necessary suction and compressed air and the like.

The two suction feed rollers 61 and 71 rotate at the same speed so that, if they were supplied with suction at the same time, they would deliver the same number of sheets. In order that the machine may be adjusted so that the upper feed roller 61 delivers only one sheet for every two, three or more sheets delivered by the lower feed roller 71, the two valves 64 and 74 which control the suction in the two suction boxes 62 and 72 are operated by separate cams 75 and 76 which are connected together by gears 77 and 78 so as to rotate at different speeds. The drive to the cams 75 and 76 and the gears 77 and 78 is through the shaft 79 of the cam controlling the operation of the lower suction feed roll 71 so that the substitution of a different pair of gears giving a different ratio for the gears 77 and 78 shown in the drawings will not affect the rate at which sheets are delivered by the lower suction feed roll 71 from the lower pile of sheets 32. Thus, by merely substituting other gears having different ratios for the gears 77 and 78, the upper feed roller 61 may be made to feed one sheet for every one, two, three, four or more sheets fed by the lower roller 71. Thus the machine may readily be adjusted for producing forms having two, three, four or more forms as may be required.

The lower suction feed roller 71 delivers the sheet from the top of the pile 32 to a pair of rollers 81 and 82 which grasp the sheet and finish drawing it off the top of the pile 32. After the sheet passes between the rollers 81 and 82 it is carried onward by a number of tapes 83 extending around the lower roller 81 and another roller 84 at a first assembling station 38.

Located at the first assembling station 38 is a combined slit perforating mechanism and an adhesive applying device. The perforating mechanism comprises an upper shaft 85 extending across the machine between the side frame 55 immediately above the path of the paper, and a pair of half-shafts 86 extending in from the sides of the machine to near the center and lying immediately below the path of the paper. The outer ends of the half-shafts 86 are carried in bearings on the side frame 55 of the machine and the inner ends are carried in bearings on brackets 87 mounted on a cross member 88. The inner end of each half-shaft 86 carries a disc 89 having a sharp edge adapted to cooperate with the edge of a circular knife 91 to cut slits in paper, the knife 91 overlapping the disc 89 so as to form rotary shears. The circular knife 91 is mounted upon the upper shaft 85 so as to rotate with it and to be axially slidable. A spring 92 between the two knives 91 presses them apart and holds each of them in tight contact with its cooperating disc 89. The edges of the knives 91 are provided with evenly spaced notches 93 so that the slits made by the knives will not be continuous but will be interrupted at each notch. Thus the knives 91, instead of cutting continuous slits, will cut two rows of slit perforations and thus form the slit perforations 29 shown in Figures 5, 6 and 11.

The upper shaft 85 and the two lower half-shafts 86 are connected together by gears 94 and 95 and are driven at such a speed that the peripheral velocity of the knives 91 and the cooperating discs 89 will be the same as the speed of the paper in which the perforations are being cut. The paper is fed to the perforating knives 91 and its speed is determined by a precision stop feed mechanism 96 located just before the perforating knives 91 and defining the exact position of the first assembling station 38. The stop feed mechanism consists of a lower roller 97 located immediately below the path of the paper and an upper roller 98 carried on the ends of levers 99. The levers 99 extend away from the rollers 97 and 98 in the direction in which the paper travels and are carried by pivots 101 located approximately at their centers. The ends of the levers 99 at the other side of the pivots 101 from the rollers 97 and 98 are formed into hooks 102 which project down toward the path of the paper. The lower roller 97 rotates continuously at a steady speed, and, when the levers 99 swing the upper roller 98 down against it, any sheets of paper that lie between the two rollers 97 and 98 are fed forward at a speed equal to the peripheral speed of the lower roller 97. When the levers 99 are swung in the other direction so that the rollers 97 and 98 are separated, the hooks 102 will project down into the path of the paper. This will permit sheets of paper to be fed, as by the tapes 83, between the two rollers 97 and 98 and up to the stop or hook 102. The stop feed mechanism 96 thus accurately locates the first assembling station 38 and holds each sheet of paper coming from the pile 32 in this assembling station for a moment so that, if a sheet of paper from the other pile 33 is to be placed upon it, it may be located accurately with respect to it.

Conventional cam means are provided for operating the stop feed 96 in synchronism with the other parts of the machine but this, as well as other conventional details, has been omitted in order to simplify and clarify the drawings. These details, as well as the details of the perforating mechanism 85 to 95, are, for the most part, conventional and well known in the art, being similar, for example, to those on the "Burton-Peerless" perforator.

While the conventional perforating mechanism is provided with only a single precision stop feed 96, I have provided a second precision stop feed 103 which is generally similar to the first and is arranged to feed sheets from the upper pile 33 to the first assembling station 38 defined by the first precision stop feed 96. The second precision stop feed 103 is connected by tapes 104 to a pair of rollers 105 and 106 which receive the sheets of paper from the upper suction feed roller 61 and draw them off of the pile of sheets 33. The second stop feed 103 is timed to stop each sheet brought to it by the tapes 104 until a sheet from the lower pile 32 has been brought up by the tapes 83 and is stopped by the first stop feed 96 at the first assembling station. The second stop feed 103 then feeds the sheet from the pile 33 in on top of the sheet from the pile 32, and when the two sheets are in registry the first stop feed 96 operates to feed them both to the perforating wheels 89 and 91.

The provision of the two precision stop feeds 96 and 103, while desirable for high speed operation, is not absolutely necessary, and the second stop feed 103 may be omitted, especially if the pile feeders for feeding the sheets of paper from the piles 32 and 33 are accurately synchronized. Also the two pile feeders 96 and 103 need not be placed as close together as shown in the drawings, for the second pile feeder 103 may be placed close to the pile of paper 33 and conveying tapes, similar to the tapes 104, may be provided between the two stop feeds.

In order to keep the number of parts of the machine to a minimum, I have combined an adhesive applying device with the perforating mechanism 85 to 95 shown in Figure 4. This device comprises a gum wheel or disc 107 located between the inner ends of the lower half-shafts 86 of the perforating device and carried by a pair of upstanding brackets 108. The brackets 108 are mounted on the top of a gum box 109 which contains a gum transfer wheel 111 placed so as to dip down into the gum or adhesive 112 in the gum box 109 and carry it up to the periphery of the gum wheel 107 with which it is in frictional contact. The gum transfer wheel 111 is driven from one of the gears 95 of the perforating device through a gear 113 and a jointed shaft 114, and, in turn, drives the gum wheel 107.

In order to prevent an excess of gum or adhesive being applied to the paper passing over the gumming attachment, a scraper 115 (shown in Figure 1A) is mounted upon the gum box 109 and is provided with a spring 116 which presses it up against the periphery of the gum wheel 107. The spring 116 is chosen to have the proper strength, or it may be made adjustable, to press the scraper 115 against the gum wheel 107 with the correct pressure which will leave exactly the desired amount of adhesive on the periphery of the wheel.

The perforating wheels 89 and 93 deliver the sheets of paper to a group of tapes or belts 119 extending between a pair of rollers 121 and 122 and which carry the perforated sheets to the second assembling station 39 where they are placed upon sheets of carbon paper.

The mechanism for providing the sheets of carbon paper is shown at the lower left of Figure 1A and comprises a shaft 123 for supporting the roll 34 of carbon paper and a pair of draw rolls 124 and 125 for continuously unrolling carbon paper from the roll 34. From the draw rolls 124 and 125, the web of carbon paper 35 hangs down in a loop within which there rests a slack roll 126, supported only by the web 35 of paper, which serves to keep the paper tight. From the slack roll 126 the web of carbon paper 35 passes over an idler roll 127 and then horizontally to and between a pair of intermittent feed rolls 128 and 129. The two intermittent feed rolls 128 and 129 are geared together and are driven through a ratchet device from a reciprocating rack 131 which is moved up and down by means of a crank 132 on a transverse shaft 133. This mechanism provides that, for every revolution of the shaft 133, the rolls 128 and 129 will turn in a direction to feed the web of carbon paper 35 during approximately one-half a revolution of the shaft 133 and will remain stationary during the rest of the revolution of the shaft 133.

In order that the length of carbon paper fed for each revolution of the shaft 133 may be adjusted, the crank 132 is provided with a slot 134 along which the crank pin 135 may be adjusted, thus varying the throw of the crank and the distance through which the rack 131 is reciprocated.

It is necessary that the speed of the draw rolls 124 and 125 relative to the speed of the crank shaft 133 be adjusted as the throw of the crank 132 is adjusted so that during each revolution of the crank shaft 133, the draw rolls 124 and 125 will draw as much carbon paper from the roll 34 as is fed during one cycle of operation of the intermittent feed rolls 128 and 129.

This is accomplished by providing the rolls 124 and 125 with any conventional type of continuously variable transmission. This transmission may be of the type having a wide V-belt connecting two pulleys whose effective diameter may be varied by placing the conical members forming the sides of the pulleys at a greater or lesser distance apart so that the V-belt will run at a greater or lesser distance from the axes of the pulleys.

The means for punching the perforations or holes 36 down the center of the web of carbon paper and the thumb cuts 31 in the edges, as shown in Figure 5, is located between the idler roll 127 and the intermittent feed rolls 128 and 129. This means comprises a conventional punch and die 136 and 137 in which the punch 136 is vertically reciprocable on guides 138 and carries the necessary punch element 139 for punching out the desired pattern of holes 36 and 31 in the carbon paper. The punch 136 is reciprocated on its guide 138 by means of a connecting rod 141, a crank 142 and a crank shaft 143. The crank shaft 143 is arranged to make one revolution for each revolution of the crank shaft 133 which actuates the intermittent feed rolls 128 and 129, and the two crank shafts 133 and 143 are synchronized so that the punch 136 operates during the period of time in which the rolls 128 and 129 are stationary.

A device for cutting the web 35 of carbon paper into separate sheets is located immediately beyond the feed rolls 128 and 129. This device may be a conventional sheeter but, for the sake of simplicity, I have shown a guillotine type of paper cutter. This consists of a pair of shear blades 144 and 145 secured to a pair of blade holders 146 and 147. One blade 145 and one holder 147 are mounted in a stationary position beneath the path of the paper, and the other blade 144 and holder 146 are arranged to reciprocate vertically on guides 148. The reciprocation of the upper blade 144 and holder 146 is accomplished by a connecting rod 149, a crank 151 and a crank shaft 152. The crank shaft 152 is synchronized with the other crank shafts 133 and 143 so that the moving blade 144 of the guillotine makes its downward cutting movement during the time that the intermittent feed rolls 128 and 129 are stationary and lifts up out of the way of the carbon paper when the feed rolls 128 and 129 are moving the carbon paper forward.

Located immediately beyond the guillotine knives 144 and 145 are a set of tapes 153 supported by a roller 154 in a position in which they will receive the end of the web of carbon paper 35 before it is cut off as a separate sheet by the knives 144 and 145. In order to insure that, after each sheet is cut off, the advancing end of the web of carbon paper 35 will pass over the roller 154 and onto the tapes 153, the roller 154 may be placed very close to the knives 144 and 145 and slightly below them or wire guides 155 may be employed to direct the end of the carbon paper along the proper path. The tapes 153 extend to and pass around a roller 156 at the second assembling station 39 and carry each sheet of carbon paper to that assembling station as soon as it is detached from the edge of the web 35. The entire mechanism for unrolling the carbon paper from the roll 34, perforating it and cutting it into sheets is synchronized with the suction feed device 71—72 for feeding sheets of paper off of the pile 32 so that one sheet of carbon paper is formed and carried by the tapes 153 to the second assembling station 39 for each sheet of writing paper that is taken off the pile 32 and carried to the first assembling station 38 and then to the second assembling station 39.

The second assembling station 39 is provided with a precision stop feed 157 similar to the stop feed 96 at the first assembling station 38. The precision stop feed 157 is arranged to receive and to stop both the sheets of carbon paper brought by the tapes 153 and the single or paired sheets of writing paper brought by the tapes 119 to the second assembling station 39. The various parts of the machine are synchronized so that the sheets of carbon paper will arrive at this assembling station at the same time as or a fraction of a second before the sheets of writing paper so that any dragging of the writing sheets on the carbon sheets will tend to push them up against the positive stop provided by the precision stop feed 157.

In order to lessen the drag of the writing sheets on the carbon sheets as they slide into place, a number of wire guides 158 are arranged to extend in between the paths of the writing sheets and the carbon sheets approximately to the point where the forward ends of the sheets are stopped by the precision stop feed 157. The guides 158 are supported by a rod 159 extending across the machine between the side frame 55, and the upper roller 161 of the stop feed is made in separate sections spaced from the guides 158 so as not to interfere with them, or the wires may stop short of the rollers.

A second gumming device 163 is located immediately beyond the precision stop feed 157 which defines the location of the second assembling station 39. The second gumming device 163 is similar in its details to the first gumming device 108 to 114 shown in Figure 4. However, instead of being combined with a slitting device, the second gumming device 163 is flanked by plain rollers 164 which serve to guide the sides of the paper as the center of the paper is being gummed. A series of tapes 165 passing over rollers 166 serve to press the paper down on the gumming device 163 and the rollers 164 flanking it. The gumming device 163 is not employed in carrying out the particular form of process illustrated in Figure 5 and described above, and, when the machine is used to carry out that particular form of process, the gumming device 163 is either removed entirely from the machine or put out of action by having all of the gum or adhesive removed therefrom.

Located beyond the second assembling station 39 and the second gumming device 163 is a mechanism for receiving the separate and successive groups of sheets formed at the second assembling station 39 and depositing the groups one after another on the top of the pile of sheets 49 at the final assembling station. This mechanism comprises a conventional chain take-off such as is used, for example, in the "Harris" offset press. The chain take-off 168 includes a pair of shafts 169 extending across the machine and each carrying a pair of sprockets 171. Two chains 172 fit around the sprockets 171 and carry a series of cross bars 173 which carry the paper grippers 174 in the conventional manner. (See Figure 3.)

The groups of sheets of paper which the grippers 174 receive and deposit upon the pile 49 are guided into the proper relation with the grippers by means of guides 175 which are provided with notches in line with each gripper so that the gripper in its open position will not strike the guide. The opening and closing of the grippers 174 is controlled in the conventional manner and is timed so that the grippers will close upon the paper just as its forward edge leaves the guide 175 and so that the grippers will open and release the paper when it is exactly above the pile 49.

The pile of paper 49 forms the final assembling station in the making of the manifold sets and is supported by a vertically movable table 176 within a receiving box 177. The table 176 is supported by a pair of vertical threaded shafts 178, one at each side of the table and connected together by a cross shaft 179 to which they are geared. Suitable means are provided for rotating the cross shaft 179 and lowering the table 176 as the size of the pile of paper 49 increases so as to keep the top of the pile at the same level. This may be accomplished by driving the shaft 179 from the shaft 68 which controls the height of the table 66 which carries one of the two piles of forms to be assembled into manifold sets. The two shafts 68 and 179 are not connected to rotate at the same speed, because more sheets of paper are added to the pile 49 associated with one shaft 79 than are removed from the other pile 32 associated with the other shaft 68, the additional sheets of paper being, of course, the sheets from the pile 33 and the carbon sheets. A variable ratio transmission of conventional type is therefore provided between the two shafts 68 and 179 so as to allow the operator of the machine to make the rate of lowering of the table 176 exactly what is necessary. The transmission used for this purpose is preferably of the infinitely variable type, such as the one described above in connection with the feeding of the carbon paper, so that the adjustment of the speed of the shaft 179 can be made accurately.

In order to more accurately position the groups of sheets of paper on the pile 49 in the receiving box 177, the side of the receiving box 177 toward which the groups of sheets of paper are moved by the chain take-off mechanism is provided with upward extensions or stops 181 which are adapted to engage the oncoming edge of the groups of paper as they are released by the grippers 174. The other side of the receiving box 177 is also provided with upward extensions 182, as shown in Figure 2, which carry rollers 183 across which the groups of sheets of paper may roll as they are being carried into the receiving box 177. The extensions 182 and rollers 183 are preferably two in number and are placed one at each side of the center line of the receiving box 177 so that they will contact the groups of sheets of paper at each side of the line of adhesive on the under surface thereof. With this construction, as each group of sheets is carried into the receiving box 177, the center line of the sheets to which the adhesive has been applied will largely be supported out of contact with the pile of sheets 49 so that there will be little or no dragging of the adhesive portion of the incoming sheets upon the sheets which have already been deposited in the receiving box. In order to prevent any interference between the upward extensions 181 and 182 on the two sides of the receiving box 177 with the gripping devices 174, the extensions 181 and 182 are placed so that they will extend up between the successive gripping devices 174 spaced along the cross bars 173, as shown in Figure 3.

In order that any slight dragging of the sheets being brought to the receiving box upon the sheets already on the pile 49 which may occur will not disturb the position of the sheets already on the pile 49, a finger 184 is provided at the side of the receiving box 177 to press down upon the edge of the top sheet in the pile 49 and to prevent its movement. The finger 184 is provided with mechanism for raising it up and withdrawing it from above the pile 49 as each group of sheets is about to drop onto the top of the pile. This mechanism, as shown in Figure 2, comprises a shaft 185 having a crank 186 which is connected by a connecting rod 187 to a knuckle pin 188 vertically reciprocable in guides 189. The knuckle pin 188 is pivoted in the lower portion of a carrier 191 upon which the finger 184 is mounted, so that the rotation of the crank shaft 185 will cause the finger 184 to rise and fall. The retracting movement of the finger 184 is accomplished by means of a spring 192 which urges the carrier 191 away from the receiving box 177 and by a roller 193 against which the cam-shaped back of the carrier 191 bears. The back of the carrier 191 is shaped so that, as the carrier rises, the spring 192 will be permitted to swing it out from the side of the receiving box 177 and so that, as the carrier descends again, it will be swung back into vertical position. In order to permit some vertical movement of the carrier 191 while the finger 184 is in contact with the pile of the paper 49, the finger 184 is carried on a stem 194 slidably mounted in the top of the carrier and pressed down by a spring 195. The shaft 185 is driven in synchronism with the operation of the other parts of the machine so that the finger 184 lifts up and retracts as each group of sheets is dropped upon the pile 49 in the receiving box.

A mechanism is provided for pressing down along the center of the pile of paper 49 after each group of sheets is added thereto in order to insure that the adhesive on the bottom of each group of sheets will adhere evenly to the uppermost of the sheets previously added to the pile and to insure that the adhesive is spread out evenly. This mechanism comprises a pressure bar or presser 201 extending horizontally above the pile of sheets 49 and having a sponge rubber pad 202 on its under surface. The presser 201 is carried by a pair of vertical bars 203 provided with teeth along one edge to form racks. The bars or racks 203 are vertically slidable in brackets and are engaged by pinions cut on the ends of a shaft 204 so that the rotation of the shaft 204 will cause the racks 203 and the presser 201 carried by them to move vertically. The shaft 204 is rotated by a pair of gears 205 which connect it with a horizontal rack 206 having a piston 207 secured at each end. The pistons 207 slide within a cylinder 208 and are reciprocated in one direction or the other by the admission of compressed air to one end or the other of the cylinder 208 through pipes 209 and 211. Thus, the admission of compressed air through one pipe 209 will cause the pistons 207 to move in one direction and the pressure bar 201 to move downwardly against the top of the pile of paper 49, and the admission of compressed air through the other air pipe 211 will cause the pistons 207 to move in the other direction and lift the presser bar 201 to a position above the lower reach of the chain 172 of the chain take-off.

As may be seen from Figures 1B and 3, the pneumatic cylinder 208 and the parts associated therewith are all located between the upper and lower reaches of the chain 172 and are supported by cross members 212 extending between the two side frames 55. Thus, when the pressure bar or presser 201 is in its upper or retracted position, the entire pressure applying mechanism is out of the path of the cross bars 173 of the chain take-off mechanism. The admission of compressed air to the two ends of the cylinder 208 through the pipes 209 and 211 is synchronized with the chain take-off mechanism so that the pressure bar 201 moves down onto the top of the pile of paper 49 immediately after one of the cross bars 173 of the chain take-off mechanism has moved out of the way and so that the pressure bar is retracted to its upper position again before the next cross bar 173 bringing the next group of sheets of paper reaches a position in which it might interfere with the pressure bar 201. In other words, as soon as each cross bar 173 has brought a group of sheets of paper to the pile 49 and has moved out of the way and before the next cross bar 173 arrives and gets in the way, the presser 201 makes a quick down stroke and a quick return so that each group of sheets is individually pressed down into position on top of the pile 49.

*Other modes of operation and products*

While I have described above only one mode of operation of my machine, that is, one process which it may carry out and one product produced by that mode of operation, the machine can be employed to carry out the process in other forms and modifications and to produce different types of manifold sets from the one form which has thus far been described.

The machine as shown in the illustrations is provided with only the punch and die device 136, 137 for cutting out, piercing or perforating the carbon paper, but provision is made for introducing additional slitting or perforating devices. Either the draw rolls 124 and 125 or the intermittent feed rolls 128 and 129 can be removed from their shafts and replaced by rolls having knives for cutting slit perforations similar to the knives 89 and 91 shown in Figure 4 or they may be replaced by rolls having knives similar to those but without the notches which break up the slits into separate perforations so that the carbon paper may have slit perforations cut in it in addition to the series of holes 36 shown in Figure 5 or else may have a central strip slit out of it, in which case the punches for producing the central perforations 36 may be removed.

One form of process using cutters for removing a central strip from the web of carbon paper is illustrated in Figure 7. This form of process, like the one illustrated in Figure 5, begins with two piles 32 and 33 of sheets of writing paper and a roll 34 of carbon paper. For making a three-part form, for example, the sheets A and B for the first and second pages of the form are arranged in alternate relation in the first pile 32 and the sheets C for the last page are arranged in the other pile 33. The sheets A and B are removed, one at a time, from the first pile 32 and brought to the first assembling station 38 while the sheets C are removed from the second pile 33 and brought to the first assembling station 38 at a rate only half as fast so that one sheet C will be brought to the first assembling station for each sheet A and no sheet C will be brought for the other sheet B from the pile 32. Thus groups composed either of only a single sheet B or of two sheets A and C will be formed at the first assembling station 38, and each group as it is formed is carried to the second assembling station 39.

When the sheets A and C are being moved from the first assembly station 38 to the second assembly station 39, they pass through the slit perforating mechanism 85 to 95 and over the gum applying device 107 to 116. Only the sheets A and B receive a central line of gum 218, the sheets C riding past the gum applying device on top of the sheets A, but all the sheets A, B and C receive two lines of perforations 219 because the perforating mechanism cuts through the sheets whether they are single or double.

At the same time as the sheets A, B and C are being removed from the piles 32 and 33 and are being assembled as described above, the web of carbon paper 214 is being unrolled from the roll 34 and the edges are being notched out to form thumb cuts 215 as it passes through the punch and die 136, 137 in the machine. In carrying out this form of the process, the plain intermittent feed rolls 128 and 129 of the machine are replaced with feed rolls having two sets of circular slitting knives adjacent to their centers so that a continuous strip 216 will be cut out of the center of the web of carbon paper 214. Thus, when the end of the web 214 of carbon paper is cut off by the knives or shear blades 144 and 145, two separate half sheets 217 will be formed instead of a single sheet having a row of perforations down the center as in the process illustrated in Figure 5. One pair of half sheets 217 is formed for each sheet A or B that is taken off the pile 32, and the half sheets 217 are brought to the second assembling station 39 as in the previously described process.

As the pairs of half sheets 217 of carbon paper and the sheets B, C and A of writing paper reach the second assembling station 39, they form successive groups of sheets which are removed as fast as they are formed and deposited in a pile 49 which forms the final assembling station. As may be seen from Figure 7, the groups of sheets thus formed will be of two different kinds arranged in alternate order. Half of the groups will contain a single writing sheet B and a pair of half sheets 217 of carbon paper and the other half of the groups will contain two writing sheets A and B and a pair of half sheets 217 of carbon paper. As the successive groups are assembled in the pile 49, each writing sheet A will adhere through the space between the half sheets 217 of carbon paper to the top of the writing sheet B immediately below it and, in a similar manner, each writing sheet B will adhere to the top of the wrinting sheet C immediately below it. Thus, sets of three writing sheets interleaved with two sheets of carbon paper will be formed in a manner similar to the form of the process illustrated in Figure 5. The final step of this form of process is the cutting of the groups of sheets into quarters in a manner similar to that illustrated in Figure 6.

The product of the process illustrated in Figure 7 and described above is shown in Figure 12 and comprises three writing sheets 221, 222 and 223 interleaved with two sheets of carbon paper 224 and 225. The writing sheets 221, 222 and 223 are secured directly to each other along the head of the form and above the upper edges of the sheets of carbon paper 224 and 225 by means of the lines of adhesive 218 and are provided with rows of slit perforations 219 extending across the sheets a short distance below the adhesive 218. The carbon sheets 224 and 225 are not secured by adhesive but remain in position merely by friction. They are provided with thumb cuts 215 and extend up far enough beyond the rows of slit perforations 219 in the writing sheets to allow them to be grasped together with the portion of the writing sheet above the perforations 219 so that the main portion of the writing sheets can be torn off along the perforations 219 and removed from the carbon sheets 224 and 225 in substantially the same way as the similar operation can be performed with the form of device shown in Figure 11. However, after the main portion of the writing sheets 221, 222 and 223 of the device shown in Figure 12 has been removed, the carbon sheets 224 and 225 can be readily removed and used as ordinary loose carbon sheets.

The process illustrated in Figure 8 is similar to the process illustrated in Figure 5 and described above except for the differences described below, and produces the same product, namely, the manifold sets shown in Figure 11. In this form of the process, which may be regarded as an upside-down version of the process illustrated in Figure 5, the top sheets A of each group of three writing sheets for each manifold set are placed in a single pile 33' and a second and third sheet B and C are placed in alternate relation in the other pile 32', all of the sheets being placed upside down. The roll of carbon paper 34' is also arranged so that the web of carbon paper 35 will be inverted as compared to its position in the previously described process, that is, the coated side is up instead of down.

In carrying out this form of the process, the first gumming device 107 to 116 of the machine is either removed or is made inoperative by having all of the adhesive removed from it so that no adhesive is applied to the sheets B or C as they move from the first assembling position 38 to the second assembling position 39. The slit perforating mechanism 85 to 95, however, operates as before so that all of the writing sheets are perforated when they arrive at the second assembling station 39 where they join the carbon sheets 37. The necessary adhesive 26' is applied in a line along the center of the carbon paper by the second gumming device 163 as the assembled groups of either two or three sheets are removed from the second assembling station 39. The application of the adhesive 26' at this point is feasible in this form of the process because the carbon paper has its coated side up and the adhesive is applied to the uncoated side with which it is able to cooperate. As it is applied, the tapes 165 press the sheets tightly against the gumming device so that adhesive is applied to the writing sheets through the holes 36 in the carbon paper.

Only two out of three writing sheets receive adhesive since every third sheet A lies on top of and is protected from the gumming device by a writing sheet C. Thus, when the separate groups of two and three sheets are finally assembled one on top of each other in the pile 49' which forms the final assembling station, the sheets will adhere to each other in groups of three writing sheets and two carbon sheets and the separate groups will separate from each other at each place where two writing sheets A and B occur together. The final arrangement of the sheets in the pile 49' is exactly the same as in the pile 49 in the process illustrated in Figure 5 except that the sheets are all inverted. The individual articles produced after the groups of sheets in the pile 49' are cut into quarters as shown in Figure 6 will be exactly the same.

Besides the two forms of manifold sets shown in Figures 11 and 12, the machine and process described above can be employed to form numerous other types of manifold sets. Some examples of these are shown in Figures 9, 10, 13 and 14. The one shown in Figure 9 comprises a single writing sheet 227 and a single carbon sheet 228 secured together by a line of adhesive 229 along their upper edges. The carbon sheet 228 is made from the form of carbon paper known as "strip carbon" which has an uncoated strip 231 to which adhesive may attach itself. The writing sheet 227 is provided with a row of perforations 232 immediately below the line of adhesive 229 and the carbon sheet 228 is provided with a thumb cut 233 so that the two sheets may be readily detached from each other.

This form of device is intended to be used with printed letterheads and the like in cases where the first form or original is to have a smooth cut upper edge instead of one torn off along a line of perforations. Therefore, in order that the carbon copy on the writing sheet 227 will be on the same standard size sheet as the original, the assembly of carbon sheet and writing sheet shown in Figure 9 is made slightly longer than the standard size sheet so that the length of the writing sheet 227 up to the line of perforation 232 will be the same as the length of the standard sheet. For example, if the device is to be used with a standard 8½ x 11 letterhead, the device will be made 8½ inches wide and 11½ inches long, one-half inch being allowed for the portion above the line of perforation 232.

The device shown in Figure 9 is made in the apparatus described above by placing all of the writing sheets 227 in the pile 32 and none in the other pile 33 so that only one writing sheet is fed for each carbon sheet 228. The carbon sheets 228 are formed from a roll of strip carbon having an uncoated strip down the center. Either one of the two gumming devices may be used depending upon whether the carbon sheets are formed with the coated side up or down. If the coated side of the carbon sheet is up, the first gumming device 107 to 116 is used and the gum is applied to the face of the writing sheets which are fed face down. If the coated side of the carbon sheets is down, the gum is applied with the second gumming device 163.

The device shown in Figure 10 is similar to the device shown in Figure 9 and is used for exactly the same purpose, similar parts being designated by similar numbers with primes. It differs therefrom, however, in that the writing sheet 227' is a little longer than the writing sheet 227 and the line of perforation 232' in the writing sheet is a little lower. Also, the carbon sheet 228' is provided with a line of perforations 234 immediately below the line of adhesive 229' and is made without the thumb cuts 233. The carbon sheet 228', however, does not extend down as far as the writing sheet 227'. This allows the two sheets to be gripped between the two lines of perforations 232' and 234 so that the main part of the carbon sheet 228' will be held while the main part of the writing sheet 227' is not held. Then the end of the writing sheet 227' which projects beyond the end of the carbon sheet 228' can be readily grasped and the writing sheets torn off along the line of perforations 232'. The carbon sheet 231' can then be torn off along the line of perforations 234 and be used in the ordinary manner.

The device shown in Figure 10 can be made upon the machines illustrated in Figures 1 to 4 in exactly the same way as the device shown in Figure 9, with the exception that either the draw rolls 124 and 125 for unrolling the web of carbon paper from the roll 34 or the intermittent feed rolls 128 and 129 are replaced by rolls having knives for making the slit perforations 234 in the carbon paper.

The device shown in Figure 13 is generally similar to the device shown in Figure 11 and similar parts are provided with corresponding numerals, the numerals referring to the parts of the device shown in Figure 13 being provided with primes. The device of Figure 13 is designed to be used when it is desired to keep the forms 21'—22' etc. together after they have been printed upon and it is desired to remove the carbon paper therefrom before the separate forms 21'—22' or writing sheets are separated. For this purpose, each carbon sheet 24' is provided with a row of perforations 236 spaced slightly below the row of perforations 29' in the writing sheets, and the writing sheets are provided with superimposed thumb-cuts 235 spaced to one side of the thumb-cuts 31' in the carbon sheets. This allows the manifold set to be gripped at the top just below the lines of perforations 29' so that the main portions of the writing sheets 21'—22' will be held. Then the carbon sheets 24'—25' can be gripped at the thumb-cuts 235 in the writing sheets and readily torn off. The writing sheets 21'—22' etc. can be torn off later separately or together as desired. This manifold set also allows the writing sheets 21'—22' etc. to be torn off first if desired in exactly the same way as can be done with the manifold set shown in Figure 11. The thumb-cuts 31' are provided for this purpose.

The process of making the device shown in Figure 13 is exactly the same as the processes described above in connection with making the device shown in Figure 11 with the exception that rolls are provided for cutting the perforations 236 in the carbon sheets in exactly the same way as for cutting the perforations 234 in the device of Figure 10, and the writing sheets 21'—22' etc. are provided with the thumb-cuts 235 before they are placed in the initial piles 32 and 33.

The manifold set shown in Figure 14 is in general similar to that shown in Figure 13 except that it is made with strip carbon which will take adhesive on both sides instead of having the carbon perforated to allow the sheets of writing paper to adhere directly to each other. Each sheet of carbon paper 238 has an uncoated strip 239 at the top which is wide enough to extend down slightly below the line of perforations 241 in the carbon paper. With this form of carbon paper, one side of the carbon paper will cooperate with the line of adhesive 242 on one sheet of writing paper adjacent to it and the other side of the sheet of carbon paper 238 will cooperate with a second line of adhesive 243 by means of which it is secured to a sheet of writing paper 245 on the other side. Superimposed thumb-cuts 246 are provided in the writing sheets 244 and 245 and similar superimposed thumb-cuts 247 spaced laterally from the thumb-cuts 246 in the writing sheets are provided in the carbon sheets so that either the carbon sheets or the writing sheets may be removed first as may be desired, exactly as with the device shown in Figure 13. It will be noted that the uncoated portion 239 of the carbon paper extends down below the perforations 241 in the carbon paper so that, if the sheets of carbon paper are removed, and later the sheets of writing paper are removed, there will be no exposed carbon on the portion from which the sheets are detached which might come in contact with and soil the hands, clothing or other articles. This eliminates one objection to the use of manifold sets or forms which has been made by the proprietors of shops selling fine lingerie, furs and the like.

The manifold set shown in Figure 14 is made in the machine described above by using both gumming devices 107 to 116 and 163, providing rollers having slit perforating wheels in place of either the carbon draw rollers 124 and 125 or the intermittent carbon feed rollers 128 and 129, and by removing the punches 139 which are used for punching the central row of holes 36 (see Figure 5) in the carbon paper. The punches for producing the thumb-cuts 247 in the carbon paper are, of course, retained and the sheets of writing paper 244, 245 etc. are provided with thumb-cuts before being placed in the pile 32 and 33. The sheets of writing paper and carbon paper may be fed to the machine with either side up so that the process carried out will be similar to either the one illustrated in Figure 5 or the one illustrated in Figure 8.

While only three writing sheets are shown in the manifold set illustrated in Figures 11 and 12 and only two are visible in Figures 13 and 14, it is to be understood that these manifold sets may be made with any number of writing sheets and that the number has been made small in the illustrations in order to simplify the illustrations and the description. Also, it may be pointed out that the various forms of the process described above may be carried out by other forms of machines than the one illustrated and described and may perhaps even be carried out by machines which, in themselves, do not lie within the scope of my invention or may be carried out by hand. In particular, it is to be clearly understood that the process may be carried out partly by hand and partly by machine as, for example, when the separate sheets of writing paper are fed from either one of the piles 32 and 33 by hand instead of by some type of automatic feeder or when any other parts or parts of the process are carried out by hand. It is also to be understood that parts of the machine may be omitted without departing from the spirit of the invention and other means, such as a manual operation, substituted for the omitted part of the machine, if necessary. The invention, therefore, is not to be regarded as being limited to what is specifically described above but includes everything that falls fairly within the scope of the following claims.

I claim as my invention:

1. In a machine for making manifold sets, means for holding a first pile of paper sheets, means for holding a second pile of paper sheets, means for feeding sheets from the first pile at a constant rate and moving them successively to a first assembly station, means for feeding sheets from the second pile at a constant rate which is an exact submultiple of said first rate and moving them successively to said first assembly station, means for removing groups of sheets from said first assembly station at a rate equal to said first rate and moving them to a second assembly station, means for moving sheets of carbon paper to said second assembly station at a rate equal to said first rate, and means for removing groups of sheets from said second assembly station at a rate equal to said first rate and placing said groups successively in a pile at a final assembly station.

2. In a machine for making manifold sets, means for assembling groups of sheets, each group comprising one sheet or two successive sheets of writing paper and one sheet of carbon paper with the coated area of said sheet of carbon paper smaller than the area of said sheet or sheets of writing paper, said means assembling said groups with different numbers of sheets in regular sequence, means for applying adhesive to the underside of at least one sheet of each group in an area having at least a portion thereof not in registry with said coated area whereby the lowermost writing sheet surface and an exposed surface on the bottom of each group will be coated with adhesive, and means for successively placing said groups in superposed relation in a pile whereby the upper and lower writing sheet surfaces in each group are secured by said adhesive to the lower and upper writing sheet surfaces of the succeeding and preceding groups, said adhesive applying means leaving free of adhesive the intercontacting surfaces of the writing sheets of groups having two writing sheets whereby the adhering together of said pile of sheets is interrupted at each of said groups having two writing sheets.

3. In a machine for making manifold sets, means for holding a first pile of paper sheets, means for holding a second pile of paper sheets, means for feeding sheets from the first pile at a constant rate and moving them successively to a first assembly station, means for feeding sheets from the second pile at a constant rate which is an exact submultiple of said first rate and moving them successively to said first assembly station, means for removing groups of sheets from said first assembly station at a rate equal to said first rate and moving them to a second assembly station, means on the path between said first and second assembly stations for perforating the sheets in said groups, means for moving sheets of carbon paper having perforations of substantial area to said second assembly station at a rate equal to said first rate, means for removing groups of sheets from said second assembly station at a rate equal to said first rate and depositing them on a third pile at a final assembly station, and means on the path between said second assembly station and said final assembly station for applying a line of adhesive across said perforations in said carbon paper.

4. In a machine for making manifold sets, means for assembling groups of sheets, each group containing one sheet or two adjacent sheets of writing paper and one sheet of carbon paper covering less than one side of said writing paper, said means assembling said groups with different numbers of sheets in regular sequence, means for applying adhesive to one side of each group and partly on said carbon sheet and partly on said writing sheet, and means for successively adding said groups to a pile.

5. In a machine for making manifold sets, means for rotatably holding a roll of carbon paper, means for intermittently feeding carbon paper from said roll, means for punching a longitudinally extending row of holes in said carbon paper, means beyond said feeding means for severing said carbon paper into separate sheets, means for successively moving said separate sheets to an assembly station, means for bringing either a single sheet or a pair of superposed sheets of writing paper to said assembly station in predetermined sequence for each of said sheets of carbon paper and depositing said sheets of writing paper on said sheets of carbon paper, an adhesive applying device, and means for removing said sheets in groups from said assembly station and passing them over said device and depositing said groups of sheets in a pile, said device being located so as to apply a line of adhesive across said holes in said carbon paper.

6. In a machine for making manifold sets, means for assembling groups of sheets, each group comprising one carbon sheet and either one writing sheet or two writing sheets on top of said carbon sheet, the coated area of said carbon sheet being less than the area of said writing sheet, means for applying adhesive to the lowermost writing sheet surface and to the lowermost uncoated surface in each group over an area not in registry with the coated area of said carbon sheet, a table, means for carrying said groups successively to and dropping said groups successively onto said table to form a pile, a presser movable from a position above the path of said groups to a position in contact with the top of said pile, and means for reciprocating said presser from said first position to said second position and back to said first position alternately with the operation of said means for dropping said groups onto said table.

7. In a machine for making manifold sets, an assembly station, means for bringing sheets of carbon paper edgewise to said assembly station, an adhesive applying device, means for moving sheets of writing paper over said device whereby a line of adhesive is applied to the underside of said sheets of writing paper, means for bringing said sheets of writing paper edgewise from said device to said assembly station and on top of said sheets of carbon paper, guide means at said assembly station between the paths of said writing sheets and said carbon sheets and extending alongside of the path of said line of adhesive whereby said sheets of writing paper may move into said assembly station without said adhesive dragging on said sheets of carbon paper, and means for removing sheets of writing paper and carbon paper together edgewise from said assembly station and said guides.

8. In a machine for making manifold sets, means for assembling groups of writing and carbon sheets and applying a line of adhesive to each group of sheets whereby at least a portion of said adhesive will appear on the bottom thereof, a table for supporting a pile of said groups, means for carrying said assembled groups successively to a position directly above said pile on said table and dropping said groups thereon whereby said adhesive will secure the bottom of each group to the top of the preceding group, a finger, means for pressing said finger on the top of said pile, and means for lifting and retracting said finger as each group of sheets is dropped on said pile and replacing said finger as the next group of sheets is carried to a position above said pile.

9. In the process of making manifold sets, the steps of arranging sheets of writing paper in a first pile and a second pile, taking sheets one by one at a constant rate from said first pile and moving them along a predetermined path, taking sheets one by one at a second constant rate from said second pile, said second rate being an exact submultiple of said first rate, moving said sheets from said second pile along a second predetermined path which merges with said first path, the movement of said sheets from said first and second piles being synchronized whereby each sheet from said second pile is placed with a sheet from said first pile and intermediate sheets from said first pile are left without sheets from said second pile, taking sheets of carbon paper and moving them one by one at a rate equal to said first rate along a predetermined path which merges with said first path, the movement of said carbon sheets being synchronized with the movement of said sheets from said first pile whereby one carbon sheet is placed with each of said sheets from said first pile and successive groups of either two or three sheets are formed in regular sequence, and successively adding said groups of sheets to a third pile whereby larger groups of alternate writing and carbon sheets are formed, the number of writing sheets in each of said larger groups being one greater than and the number of carbon sheets being equal to the reciprocal of said submultiple.

10. In the process of making manifold sets, the steps of arranging sheets of writing paper in a first pile and a second pile, taking sheets one by one from said first pile, taking one sheet from said second pile for each predetermined number of sheets taken from said first pile and placing said sheet from said second pile with the first of said predetermined number of sheets from said first pile, placing a sheet of carbon paper with each sheet from said first pile, the placing of sheets from said second pile and sheets of carbon paper with said sheets from said first pile forming groups of two or three sheets in regular sequence, and successively placing said groups of sheets in a pile whereby larger groups of alternate writing and carbon sheets are formed, the number of writing sheets in each of said larger groups being one more than and the number of carbon sheets being equal to said predetermined number.

11. In the process of making manifold sets, the steps of taking sheets of writing paper and sheets of carbon paper, all of the sheets of carbon paper having similarly located rows of holes, placing the sheets in a pile with either a single sheet or a pair of sheets of writing paper between successive sheets of carbon paper, the pairs of sheets and single sheets occurring in a regular recurring order and all of the carbon sheets having their coated sides facing in the same direction and their rows of holes superposed, placing lines of adhesive on said sheets before placing said sheets in said pile, one line of adhesive being placed for each of said row of holes and said line of adhesive being placed so as to lie between a sheet of writing paper on one side and the uncoated face of the piece of carbon paper on the other side and to extend across said holes whereby said line of adhesive also lies against the portions of a second sheet of writing paper in registry with said holes, allowing said lines of adhesive to set and thereby secure said sheets of paper in sets whose limits are defined by said pairs of sheets, and cutting said sets along the center of said lines of adhesive and thereby forming separate sets each secured together along one edge.

12. In the process of making manifold sets, the steps of taking a continuous web of carbon paper, punching a row of holes longitudinally of said web, cutting successive sheets from the end of said web, placing either single sheets or separable paired sheets of writing paper on each sheet of carbon paper in predetermined sequence with the coated side of said sheets of carbon paper adjacent to said sheets of writing paper to form groups of either two or three sheets, applying a line of adhesive to the uncoated side of each sheet of carbon paper across said holes and to the surface of the writing paper exposed by said holes, placing said groups of sheets in a pile with said lines of adhesive superposed, allowing said adhesive to dry whereby said sheets are secured together in sets whose limits are defined by said separable paired sheets, and cutting said sets along the center of said lines of adhesive and thereby forming separate sets of sheets each secured together along one edge.

13. The process of making manifold sets which includes the steps of forming successive groups of sheets of writing paper and carbon paper, each group consisting of one sheet or two successive sheets of writing paper and of one sheet of carbon paper, each sheet of carbon paper having a coating on the side thereof in contact with the adjacent sheet of writing paper and having the exposed side thereof uncoated and adapted to operatively receive an adhesive and having a row of apertures of substantial area, placing a line of adhesive across said apertures on each of said groups of sheets, and placing said groups in a pile whereby each line of adhesive will cause each sheet of carbon paper and each sheet of writing paper in contact with a coated side of a sheet of carbon paper to adhere to the sheet of writing paper in the adjacent group of sheets and in contact with the uncoated side of said sheet or carbon paper.

14. The process of making manifold sets which includes the steps of forming successive groups of sheets of writing paper and carbon paper, each group consisting of one sheet or two succesive sheets of writing paper and of one sheet of carbon paper, each sheet of carbon paper having one side exposed and coated and having the other side in contact with the adjacent sheet of writing paper and uncoated and having a row of apertures of substantial area, each sheet of writing paper and sheet of carbon paper in contact with each other having a line of adhesive extending across said holes and securing said sheets together, and placing said groups in a pile whereby each sheet of writing paper in contact with the uncoated side of a sheet of carbon paper will adhere through said apertures to the sheet of writing paper brought into contact with the coated side of said carbon paper by said piling.

15. The process of making manifold sets which includes the steps of forming successive groups of sheets of writing paper and carbon paper, each group consisting of one sheet or two successive sheets of writing paper and of two half-sheets of carbon paper located side by side on one side of said group with a narrow space therebetween along the center of said group, applying a line of adhesive along the center of each of said groups, placing said groups in a pile whereby each pair of half-sheets of carbon paper will lie between two sheets of writing paper and said last mentioned sheets will be secured together by said adhesive, and cutting said pile along the center of said line of adhesive.

16. In a machine for assembling manifold sets, means defining a path for paper, a pair of rotary cutting disks on opposite sides of said path and cooperating to cut a row of slits in paper moving along said path, and a gumming wheel coaxial and adjacent to one of said cutting disks, said gumming wheel having the same diameter as said cutting disk and operating to apply a line of adhesive to said paper parallel and adjacent to said row of slits.

17. In a machine for assembling manifold sets, means defining a path for paper, a shaft extending across and adjacent to said path, a pair of cutting disks mounted on said shaft, a pair of aligned shaft members parallel to said shaft and on the opposite side of said path from said shaft, a pair of cutting disks on the adjacent ends of said shaft members and cooperating with said first pair of cutting disks to form means for forming two lines of perforations in paper moving along said path, and a gumming wheel between the ends of said shaft members for applying a line of gum between said lines of perforations.

18. In a machine for assembling manifold sets, means for holding a plurality of piles of sheets, said means including a vertically movable table for holding one pile of said piles of sheets, a shaft for so moving said table, means for moving sheets from said piles to an assembly station, a vertically movable table at said assembly station for receiving said moved sheets, a second shaft for so moving the table at said assembly station, and adjustable means for driving said second shaft from said first shaft at a variable ratio for maintaining the tops of the piles of sheets on said tables at a constant level.

19. In a machine for making manifold sets, means for holding a first pile of paper sheets, a vertically movable table for holding a second pile of paper sheets, means for feeding sheets from the first pile at a constant rate and moving them successively to a first assembly station, means for feeding sheets from the second pile at a constant rate which is an exact submultiple of said first rate and moving them successively to said first assembly station, said means including a shaft for vertically moving said table, means for removing groups of sheets from said first assembly station at a rate equal to said first rate and moving them to a second assembly station, means for perforating the sheets in said groups as they are moved between said first and second assembly stations, means for moving sheets of carbon paper having perforations to said second assembly station at a rate equal to said first rate, means for removing groups of sheets from said second assembly station at a rate equal to said first rate and depositing them on a third pile at a final assembly station, a second vertically movable table at said final assembly station for receiving the groups of sheets from said second assembly station, a shaft for so moving said second table, and adjustable means for driving said second shaft from said first shaft at a variable ratio for maintaining the tops of the piles of sheets on said tables at a constant level.

20. In a machine for making manifold sets, means for feeding sheets of paper in predetermined multiple sequence, feeding means for carbon paper, means for severing said carbon paper into sheets, means for applying adhesive to said sheets of paper, means for feeding said severed carbon sheets in predetermined sequence, means for receiving and adhesively uniting said sheets of paper and carbon to form manifold assemblies, feeding means for said assemblies, and receiving means operatively connected to said feeding means for holding said assemblies in superimposed aligned relation and for maintaining the top of said assemblies at a constant level.

21. In a machine for making manifold sets, flat feeding means for sheets of paper, roll feeding means for carbon paper, means for severing and adhesively uniting carbon sheets with said sheets of paper to form manifold assemblies, means for feeding said carbon and sheet assemblies, means for receiving said carbon and sheet assemblies in superimposed aligned relation, and means adjusting said receiving means for maintaining the top of said superimposed carbon and sheet assemblies at a constant level.

HARRY SLOPER JONES.